US 012474460B2

(12) United States Patent
Ye

(10) Patent No.: US 12,474,460 B2
(45) Date of Patent: Nov. 18, 2025

(54) RADAR POSITIONING METHOD, POSITIONING RADAR AND POSITIONING SYSTEM

(71) Applicant: LONGRUN INFORMATION & TECHNOLOGY (HK) LIMITED, Hong Kong (CN)

(72) Inventor: Lei Ye, Hong Kong (CN)

(73) Assignee: LONGRUN INFORMATION & TECHNOLOGY (HK) LIMITED, Hong Kong (CN)

( * ) Notice: Subject to any disclaimer, the term of this patent is extended or adjusted under 35 U.S.C. 154(b) by 337 days.

(21) Appl. No.: 18/203,614

(22) Filed: May 30, 2023

(65) Prior Publication Data

US 2023/0305133 A1  Sep. 28, 2023

Related U.S. Application Data

(63) Continuation of application No. PCT/CN2021/102809, filed on Jun. 28, 2021.

(30) Foreign Application Priority Data

May 11, 2021  (CN) .......................... 202110511801.4

(51) Int. Cl.
 *G01S 13/42*  (2006.01)
 *G01S 1/02*   (2010.01)
(52) U.S. Cl.
 CPC ............... *G01S 13/42* (2013.01); *G01S 1/02* (2013.01)

(58) Field of Classification Search
 CPC . G01S 13/42; G01S 1/02; G01S 13/06; G01S 13/75; G01S 13/931; G01S 5/06; G01S 2013/9329
 See application file for complete search history.

(56) References Cited

U.S. PATENT DOCUMENTS 3,996,590 A * 12/1976 Hammack ................. G01S 5/16
                                                       342/107
2008/0040029 A1   2/2008 Breed
 (Continued)

FOREIGN PATENT DOCUMENTS

CN    105629201 A    6/2016
CN    109725324 A    5/2019
 (Continued)

OTHER PUBLICATIONS

DE102014216276A1_translate.pdf (Year: 2016).*
 (Continued)

*Primary Examiner* — VLadimir Magloire
*Assistant Examiner* — Yonghong Li
(74) *Attorney, Agent, or Firm* — IPro, PLLC

(57) ABSTRACT

The present disclosure discloses a radar positioning method, a positioning radar and a positioning system. Reflection data of a radar beacon combination is received, a distance from a target object to each beacon is determined based on the reflection data, and position information of the target object is determined based on a distance from the target object to each beacon and pre-stored position information of each beacon. Thus, accurate position information may be provided where a satellite positioning signal of the target object is weak or there is no satellite positioning signal.

8 Claims, 6 Drawing Sheets

(56) References Cited

U.S. PATENT DOCUMENTS

2012/0071170 A1    3/2012   Cho et al.
2016/0069985 A1    3/2016   Kwakkernaat et al.
2021/0190939 A1*   6/2021   Kim .......................... G01S 1/44

FOREIGN PATENT DOCUMENTS

| CN | 109031269 B | | 7/2020 | | |
| --- | --- | --- | --- | --- | --- |
| CN | 111847155 A | | 10/2020 | | |
| CN | 112363157 A | | 2/2021 | | |
| DE | 102014216276 A1 | * | 2/2016 | ............ | G01S 13/74 |
| JP | 2018510373 A | | 4/2018 | | |
| WO | 2008143483 A1 | | 11/2008 | | |
| WO | 2016160376 A1 | | 10/2016 | | |

OTHER PUBLICATIONS

Positioning and Trilateration—Alan Zucconi.pdf (Year: 2017).*
An_improved_underwater_acoustic_network_localization_algorithm. pdf (Year: 2015).*
Qingbo Meng, et al. "An Improved Underwater Acoustic Positioning Algorithm." Marine Sciences. 43.11 (2019): 84-90.
Jieru He, et al. "Research on Accurate Positioning Method of Mine Personnel." Coal Mine Machinery. 41.12 (2020): 31-34.
Zhiyu Xie, et al. "Research and design of underground coal mine positioning method based on Taylor algorithm." Computer Engineering and Applications. 53.2 (2017): 231-235.

* cited by examiner

| Positioning Radar | | |
|---|---|---|
| Identication | Count | Position information of beacon |
| 1a | 1 | $(X_{1,1}, Y_{1,1}, Z_{1,1})$ |
| | | $(X_{1,2}, Y_{1,2}, Z_{1,2})$ |
| | | $(X_{1,3}, Y_{1,3}, Z_{1,3})$ |
| 1b | 2 | $(X_{2,1}, Y_{2,1}, Z_{2,1})$ |
| | | $(X_{2,2}, Y_{2,2}, Z_{2,2})$ |
| | | $(X_{2,3}, Y_{2,3}, Z_{2,3})$ |
| 1c | 3 | $(X_{3,1}, Y_{3,1}, Z_{3,1})$ |
| | | $(X_{3,2}, Y_{3,2}, Z_{3,2})$ |
| | | $(X_{3,3}, Y_{3,3}, Z_{3,3})$ |
| 1d | 4 | $(X_{4,1}, Y_{4,1}, Z_{4,1})$ |
| | | $(X_{4,2}, Y_{4,2}, Z_{4,2})$ |
| | | $(X_{4,3}, Y_{4,3}, Z_{4,3})$ |

RADAR POSITIONING METHOD, POSITIONING RADAR AND POSITIONING SYSTEM

CROSS-REFERENCE TO RELATED APPLICATION

This application claims the benefit of Chinese Patent Application No. 202110511801.4, filed on May 11, 2021, which is incorporated herein by reference in its entirety.

FIELD

The present disclosure relates to the field of positioning, and in particular, to a radar positioning method, a positioning radar, and a positioning system.

BACKGROUND

With the development of technology, it is necessary to determine an accurate position of a target object in many occasions. The prior art is generally implemented through a satellite positioning technology. However, if only satellite positioning is relied on, a satellite positioning signal is blocked and positioning is difficult in some occasions or environments where a satellite signal is poor.

SUMMARY

In the view of this, a purpose of the embodiments of the present disclosure is to provide a radar positioning method, a positioning radar and a positioning system, so that accurate position information may be provided where a satellite positioning signal of a target object is weak or there is no satellite positioning signal.

According to a first aspect, an embodiment of the present disclosure provides a radar positioning method, where the radar positioning method includes:
  receiving reflection data of a radar beacon combination, where the radar beacon combination includes a plurality of beacons and the reflection data is echo signals reflected by each of the beacons;
  determining a distance from the target object to each of the beacons based on the reflection data; and
  determining position information of the target object based on a distance from the target object to each of the beacons and pre-stored position information of each of the beacons.

In some embodiments, the method further includes:
  determining counting information of the radar beacon combination,
  where determining position information of the target object based on the distance from the target object to each of the beacons and pre-stored position information of each of the beacons includes:
  obtaining position information of each of the beacons from pre-stored data based on the counting information; and
  determining the position information of the target object based on the distance from the target object to each of the beacons and the position information of each of the beacons.

In some embodiments, determining the distance from the target object to each of the beacons based on the reflection data includes:
  determining a time difference based on transmission time of the radar signal and reception time of the echo signal; and
  determining a distance from the target object to each of the beacons based on the time difference.

In some embodiments, the radar beacon combination includes a first beacon, a second beacon, and a third beacon.

In some embodiments, determining the position information of the target object based on the distance from the target object to each of the beacons and pre-stored position information of each of the beacons includes:
  determining position information of the target object in the current step;
  determining a matrix parameter based on the position information of the target object in the current step and the position information of each of the beacons;
  determining an error correction value based on the matrix parameter and the distance from the target object to each of the beacons;
  determining estimation precision based on the error correction value;
  in response to the estimation precision being greater than or equal to a predetermined threshold, adjusting the position information of the target object in the current step based on the error correction value; and
  in response to the estimation precision being less than the predetermined threshold, determining the position information of the target object in the current step as the position information of the target object.

According to a second aspect, an embodiment of the present disclosure provides a positioning radar, where the positioning radar includes:
  a radar ranging unit including a transmitting apparatus and a receiving apparatus, where the transmitting apparatus is configured to sends a transmitted electric wave in a predetermined direction; and the receiving apparatus is configured to receive reflection data of a radar beacon combination, where the radar beacon combination includes a plurality of beacons, and the reflection data is an echo signal reflected by each of the beacons;
  a control apparatus configured to determine the distance from the target object to each of the beacons based on the reflection data and to determine the position information of the target object based on the distance from the target object to each of the beacons and the pre-stored position information of each of the beacons.

In some embodiments, the control apparatus is further configured to determine counting information of the radar beacon combination,
  where the control apparatus is configured to obtain position information of each of the beacons from pre-stored data based on the counting information and to determine the position information of the target object based on the distance from the target object to each of the beacons and the position information of each of the beacons.

In some embodiments, the control apparatus is configured to determine a time difference based on transmission time of the radar signal and reception time of the echo signal and to determine the distance from the target object to the beacon based on the time difference.

In some embodiments, the control apparatus is configured to:
  determine position information of the target object in the current step;

determine a matrix parameter based on the position information of the target object in the current step and the position information of each of the beacons;

determine an error correction value based on the matrix parameter and the distance from the target object to each of the beacons;

determine estimation precision based on the error correction value;

in response to the estimation precision being greater than or equal to a predetermined threshold, adjust the position information of the target object in the current step based on the error correction value; and in response to the estimation precision being less than the predetermined threshold, determine the position information of the target object in the current step as the position information of the target object.

According to a third aspect, an embodiment of the present disclosure provides a positioning system, where the positioning system includes:

at least one radar beacon combination; and the positioning radar as described in the second aspect.

The technical solutions of the embodiment of the present disclosure receive reflection data of a radar beacon combination, determine a distance from a target object to each beacon based on the reflection data, and determine position information of the target object based on a distance from the target object to each beacon and pre-stored position information of each beacon. Thus, accurate position information may be provided where a satellite positioning signal of the target object is weak or there is no satellite positioning signal.

BRIEF DESCRIPTION OF THE DRAWINGS

Through the following description of the embodiments of the present disclosure with reference to the accompanying drawings, the above described and other purposes, features and advantages of the present disclosure will be more apparent. In the accompanying drawings.

DETAILED DESCRIPTION

The present disclosure is described below based on embodiments, but the present disclosure is not merely limited to these embodiments. In the following detailed description of the present disclosure, some specific details are described in detail. Those skilled in the art may fully understand the present disclosure without the description of these details. In order to avoid obscuring the essence of the present disclosure, well-known methods, processes, procedures, elements and circuits are not described in detail.

In addition, those of ordinary skill in the art should be understood that drawings provided herein are for illustrative purposes, and the drawings are not necessarily drawn to scale.

Meanwhile, it should be understood that in the following description, "circuit" refers to a conductive loop constituted by at least one element or sub-circuit through an electrical connection or an electromagnetic connection. When an element or circuit is referred to as being "connected to" another element or an element/circuit is referred to as being "connected" between two nodes, it may be directly coupled or connected to another element or there may be intermediate elements, and the connection between the elements may be physical, logical, or a combination thereof. On the contrary, when an element is referred to as being "directly coupled to" or "directly connected to" another element, it means that there is no intermediate element between the two elements.

Unless specifically required in the context, words like "include", "contain" etc. in the description should be interpreted as inclusive rather than exclusive or exhaustive meanings; that is to say, "including, but not limited to".

In the description of the present disclosure, it should be understood that the terms "first", "second", etc. are merely used for descriptive purposes, but cannot be understand as indicating or implying relative importance. In addition, in the description of the present disclosure, unless otherwise stated, "a plurality of" means two or more.

Figure 1:
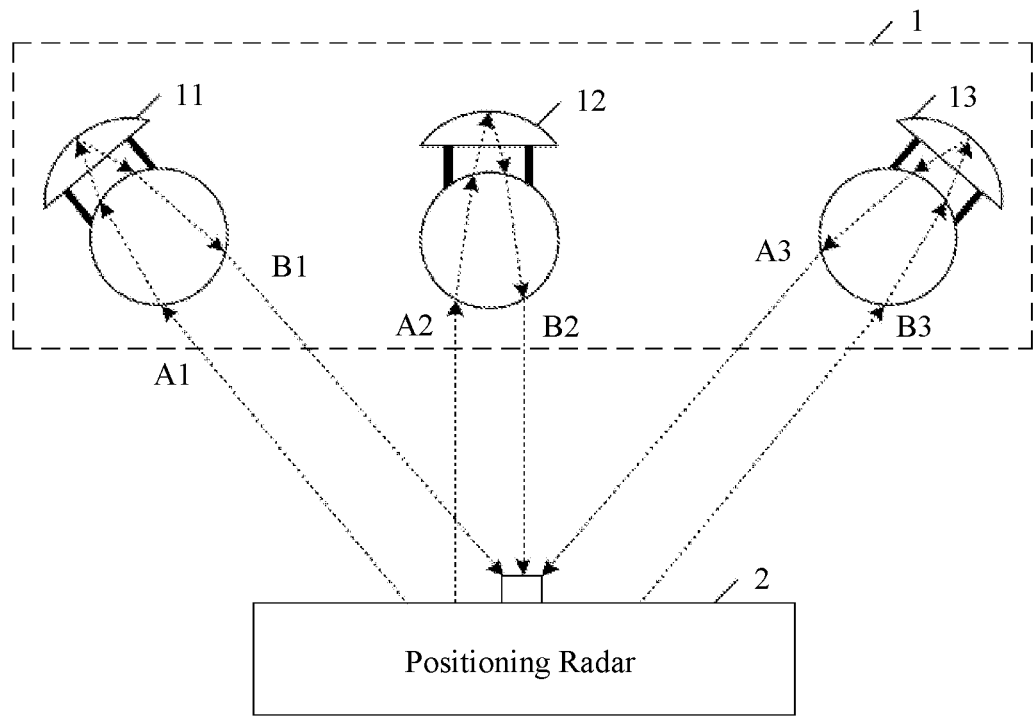
FIG. 1 is a schematic diagram of a radar positioning system according to a first embodiment of the present disclosure.

FIG. 1 is a schematic diagram of a positioning system according to a first embodiment of the present disclosure. In the embodiment shown in FIG. 1, the positioning system includes a radar beacon combination 1 and a positioning radar 2, where the radar beacon combination 1 includes three beacons, respectively a first radar 11, a second radar 12, and a third radar 13. The positioning radar 2 is installed at a predetermined position of a target object. For example, in some construction scenarios, an excavator is often required to dig a hole, or a bucket of the excavator is required to go deep into the hole for work. At this time, a worker usually cannot directly determine a position of the excavator, and the positioning radar 2 may be installed on the bucket of the excavator to position the position of the bucket of the excavator. It should be understood that position information of the target object and position information of the positioning radar described below are the same position information.

Figure 2:
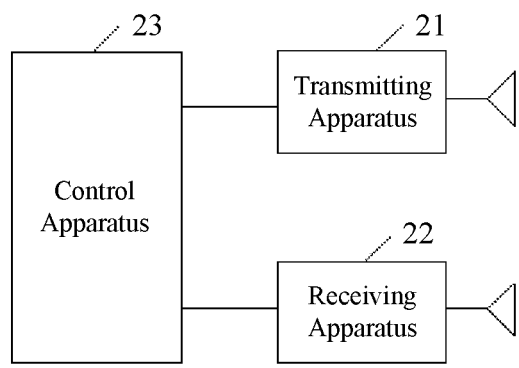
FIG. 2 is a schematic structural diagram of a positioning radar according to an embodiment of the present disclosure.

Further, FIG. 2 is a schematic diagram of a positioning radar according to an embodiment of the present disclosure. As shown in FIG. 2, the positioning radar in the embodiment of the present disclosure includes a transmitting apparatus 21, a receiving apparatus 22, and a control apparatus 23.

In this embodiment, in conjunction with FIG. 1, the transmitting apparatus 21 is configured to transmit an electric wave in a predetermined direction, and the transmitted electric waves shown in FIG. 1 include A1, A2, and A3. It should be understood that in actual use, the starting points of the transmitted electric waves A1, A2, and A3 are the same point, but for ease of understanding, the starting points of the electric waves A1, A2, and A3 in FIG. 1 are not the same starting point.

In this embodiment, the receiving apparatus 22 is configured to receive reflection data of a radar beacon combination, where the radar beacon combination includes a plurality of beacons and the reflection data is an echo signal reflected by each of the beacons.

In conjunction with FIG. 1, the radar beacon combination 1 includes three beacons, namely a first beacon 11, a second beacon 12, and a third beacon 13, where the first beacon 11 receives the electric wave A1 and generates an echo signal B1; the second beacon 12 receives the electric wave A2 and generates an echo signal B2; the third beacon 13 receives the electric wave A3 and generates an echo signal B3. The receiving apparatus 22 receives the echo signals B1, B2, and B3.

Further, position information of the first beacon 11, the second beacon 12, and the third beacon 13 is known, and specifically, the position information of the beacons may be determined by a level gauge during construction and installation, where the position information is coordinates. For example, the coordinates of the first beacon 11 are $(X_1, Y_1, Z_1)$, the coordinates of the second beacon 12 are $(X_2, Y_2, Z_2)$, and the coordinates of the third beacon 13 are $(X_3, Y_3, Z_3)$.

In this embodiment, the control apparatus 23 is configured to determine the distance from the target object to each of the beacons based on the reflection data and to determine the position information of the target object based on the distance from the target object to each of the beacons and the pre-stored position information of each of the beacons, where the reflection data is the echo signal reflected by each of the beacons.

Further, when the transmitting apparatus 21 transmits an electric wave, the control apparatus 23 records a first time when the electric wave is transmitted, and after receiving an echo signal through the receiving apparatus 22, the control apparatus 23 obtains a second time when the echo signal is received and calculates a distance from the positioning radar to the beacon based on the first time and the second time.

Specifically, for the first beacon 11, assuming that the first time when the electric wave is transmitted is $t_{11}$, and the second time when the echo signal is received is $t_{12}$, then a distance $R_1$ from the positioning radar to the first beacon is:

$$R_1 = \frac{V*(t_{12} - t_{11})}{2}$$

where V is a relaying speed of the electric wave, which is usually approximately the speed of light; $t_{11}$ is the first time when the electric wave is transmitted, and $t_{12}$ is the second time when the echo signal is received.

Based on the same method, a distance $R_2$ from the positioning radar to the second beacon and a distance $R_3$ from the positioning radar to the third beacon may be obtained.

Figure 3:
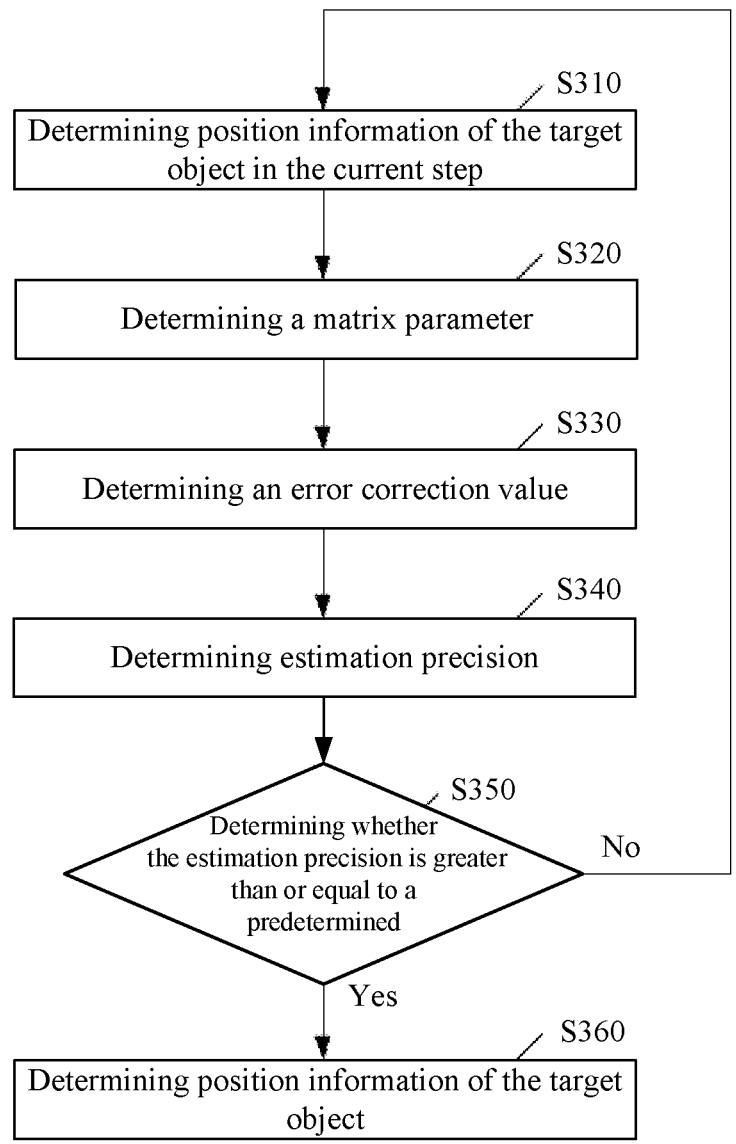
FIG. 3 is a flowchart of determining position information of a target object according to an embodiment of the present disclosure.

Further, the control apparatus 23 determines the position information of the target object based on the distance from the target object to each of the beacons and the pre-stored position information of each of the beacons. Specifically, the control apparatus 23 determines the position information of the target object as shown in FIG. 3, and includes the following steps:

in step S310, determining position information of the target object in the current step.

In this embodiment, if the current step is the first execution step, an initial value may be set for the position information of the target object; if the current step is not the first execution step, the position information of the target object in the current step may be determined based on the position information of the last execution step and the error correction value. The details are as described in the following step S350. The embodiment of the present disclosure records the position information of the target object as $(X_u, Y_u, Z_u)$.

In step S320, determining a matrix parameter based on the position information of the target object in the current step and the position information of each of the beacons.

As described above, it may be obtained that the coordinates of the first beacon 11 are $(X_1, Y_1, Z_1)$, the coordinates of the second beacon 12 are $(X_2, Y_2, Z_2)$, the coordinates of the third beacon 13 are $(X_3, Y_3, Z_3)$, and the position information of the target object is $(X_u, Y_u, Z_u)$. The matrix parameter M is as follows:

$$M = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix}$$

where, $\alpha_{i1} = \frac{X_i - X_u}{R_i}, \alpha_{i2} = \frac{Y_i - Y_u}{R_i}, \alpha_{i3} = \frac{Z_i - Z_u}{R_i}, i = 1, 2, 3.$ Thus, the matrix parameter M may be obtained.

In step S330, determining an error correction value based on the matrix parameter and the distance from the target object to each of the beacons.

As described above, the coordinates of the first beacon 11 are $(X_1, Y_1, Z_1)$, the coordinates of the second beacon 12 are $(X_2, Y_2, Z_2)$, the coordinates of the third beacon 13 are $(X_3, Y_3, Z_3)$, and the position information of the target object is $(X_u, Y_u, Z_u)$, at the same time, the distance from the target object to the first beacon is $R_1$, the distance from the target object to the second beacon is $R_2$, and the distance from the target object to the third beacon is $R_3$. Thus, the following may be obtained:

$$R_1 = \sqrt{(X_1-X_u)^2+(Y_1-Y_u)^2+(Z_1-Z_u)^2}$$

$$R_2 = \sqrt{(X_2-X_u)^2+(Y_2-Y_u)^2+(Z_2-Z_u)^2}$$

$$R_3 = \sqrt{(X_3-X_u)^2+(Y_3-Y_u)^2+(Z_3-Z_u)^2}$$

Further, by linearizing the above formula, it may be obtained that:

$$\begin{bmatrix} dR_1 \\ dR_2 \\ dR_3 \end{bmatrix} = \begin{bmatrix} \alpha_{11} & \alpha_{12} & \alpha_{13} \\ \alpha_{21} & \alpha_{22} & \alpha_{23} \\ \alpha_{31} & \alpha_{32} & \alpha_{33} \end{bmatrix} \begin{bmatrix} dX_u \\ dY_u \\ dZ_u \end{bmatrix}$$

That is, $$\begin{bmatrix} dR_1 \\ dR_2 \\ dR_3 \end{bmatrix} = M \begin{bmatrix} dX_u \\ dY_u \\ dZ_u \end{bmatrix}$$

Thus, the error correction value may be obtained as:

$$\begin{bmatrix} dX_u \\ dY_u \\ dZ_u \end{bmatrix} = M^{-1} \begin{bmatrix} dR_1 \\ dR_2 \\ dR_3 \end{bmatrix}$$

where $dX_u$ is a first correction value, $dY_u$ is a second correction value, and $dZ_u$ is a third correction value.

In step S340, determining estimation precision based on the error correction value.

Further, the calculation formula of the estimation precision $dE^2$ is:

$$dE^2 = dX_u^2 + dY_u^2 + dZ_u^2$$

Thus, the estimation precision may be obtained.

In step S350, determining whether the estimation precision is greater than or equal to a predetermined threshold.

In this embodiment, the predetermined threshold is set in advance, the estimation precision is compared with the predetermined threshold, and it is judged whether the estimation precision is greater than or equal to the predetermined threshold.

In response to the estimation precision being greater than or equal to the predetermined threshold, returning to step S310, the position information of the target object in the current step is adjusted based on the error correction value. Specifically, the adjusted formula is as follows:

$$X'_u = X_u + dX_u,$$

$$Y'_u = Y_u + dY_u$$

$$Z'_u = Z_u + dZ_u$$

where $X'_u, Y'_u, Z'_u$ are adjusted position information.

In response to the estimation precision being less than the predetermined threshold, step S360 is entered.

In step S360, determining position information of the target object in the current step as the position information of the target object.

In response to the estimation precision being less than the predetermined threshold, the position information of the target object in the current step is determined as the position information of the target object.

Thus, the position information of the target object may be determined.

The embodiment of the present disclosure receives reflection data of a radar beacon combination, determines a distance from a target object to each of the beacons based on the reflection data, and determines the position information of the target object based on a distance from the target object to each of the beacons and pre-stored position information of each of the beacons. Thus, accurate position information may be provided where a satellite positioning signal of the target object is weak or there is no satellite positioning signal.

Figures 4, 5:
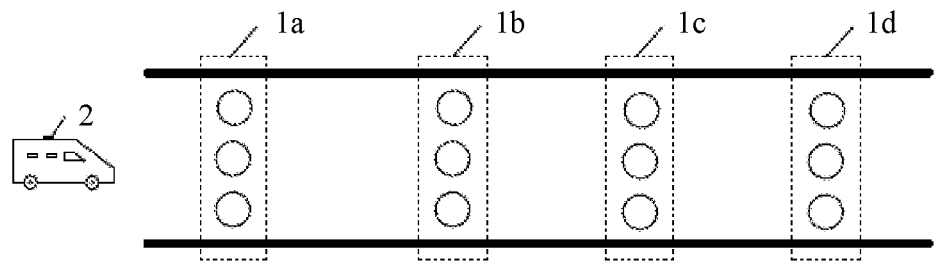
FIG. 4 is a schematic diagram of a radar positioning system according to a second embodiment of the present disclosure.
FIG. 5 is a schematic diagram of pre-stored data according to an embodiment of the present disclosure.

FIG. 4 is a schematic diagram of a positioning system according to a second embodiment of the present disclosure. In the embodiment shown in FIG. 4, the positioning system includes a plurality of radar beacon combinations and a positioning radar 2, where the positioning radar 2 is installed on transportation means. The radar beacon combinations 1a, 1b, 1c and 1d are preinstalled on buildings, and the buildings may be tunnels, parking lots, and the like. The positioning radar 2 may transmit and receive a radio wave. The radar beacon combination may reflect the radio wave transmitted by the positioning radar 2.

When the transportation means is driving, the positioning radar 2 moves relatively to the radar beacon combination along with the transportation means, the positioning radar 2 continuously sends a transmitted radio wave in a predetermined direction, the radar beacon combination reflects the radio wave to form an echo signal, and the positioning radar 2 receives the echo signal. The positioning radar 2 positions the moving transportation means based on the received echo signal.

Further, each radar beacon combination includes three beacons.

Further, each radar beacon combination may be arranged equidistantly in the tunnel, and the count of each radar beacon combination and the position information of each of the beacons may be stored in advance. Specifically, taking four radar beacon combinations in FIG. 4 as an example, the stored data is as shown in FIG. 5. In FIG. 5, in $(X_{j,i}, Y_{j,i}, Z_{j,i})$, j represents counts, j=1, 2, 3 . . . , N, and N is a positive integer greater than 0; i=1, 2, 3, respectively represents the number of each of the beacons in the radar beacon combination.

Figure 6:
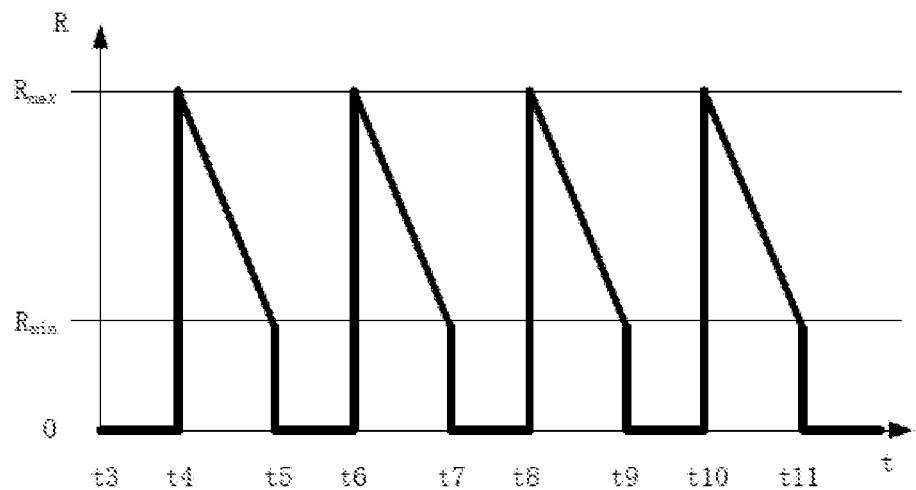
FIG. 6 is a curve diagram of distance change according to an embodiment of the present disclosure.

In this embodiment, the control apparatus may determine counting information based on the echo signal. Specifically, the description is given in conjunction with FIG. 4 and FIG. 6. In FIG. 6, the ordinate represents the distance R calculated by the control apparatus. The distance R may be a distance from the positioning radar to any of the beacon in the radar beacon combination, or may be an average value of the distance from the positioning radar to a plurality of the beacons in the radar beacon combination, and the distance R is not limited in the embodiment of the present disclosure. Specifically, the process of determining the distance R to each of the beacons by the positioning radar in the embodiment of the present disclosure is as described above, and details are not described herein again. Since the positioning radar 2 sends a transmitted electric wave in a predetermined direction, the beacons may reflect the echo signal only when the positioning radar is in a predetermined interval. Assuming that the transportation means starts to enter the tunnel at time t3, at this time, each radar beacon combination cannot receive the transmitted electric wave and does not reflect the echo signal, the calculated distance is 0 at this time. With the continuous movement of the transportation means, at time t4, a radar beacon combination 1a starts to receive the transmitted electric wave and returns the echo signal, at this time, the distance between the positioning radar and the radar beacon combination 1a is far, and the calculated distance is $R_{max}$. With the continuous movement of the transportation means, the distance between the positioning radar and the radar beacon combination 1a decreases gradually, and at time t5, the distance decreases to $R_{min}$. At the same time, because the radar beacon combination 1a is not in the coverage of the transmitted electric wave, the distance is decreased sharply from $R_{min}$ to 0. Similarly, at times t6, t8, and t10, radar beacon combinations 1b, 1c, and 1d start to receive the transmitted electric wave, and return the echo signal. At times t7, t9, and t11, the radar beacon combinations 1b, 1c and 1d are not in the coverage of the transmitted electric wave respectively.

Since the distance calculated by the positioning radar has a certain regularity change, counting may be performed based on the calculated distance. For example, one counting may be performed once for each increase in distance, that is, the counting is performed respectively at times t4, t6, t8 and t10; alternatively, the first counting is performed when the transportation means immediately enters the tunnel, and then one counting may be performed once for each sudden decrease in distance, that is, the counting is performed respectively at times t3, t5, t7, and t9. After the counting, position information of the beacon is obtained in pre-stored data based on the current count, and then the position information of the positioning radar, that is, the position information of the target object, is determined based on the position information of the beacon and the calculated distance.

In some embodiments, the transmitting direction of the radar, the installation position of the beacon, and the installation direction of the beacon may be set in advance, such that when a vehicle is driving in the tunnel, the positioning radar at one position may receive at most an echo signal returned by one radar beacon combination.

The embodiment of the present disclosure receives reflection data of a radar beacon combination, determines a distance from a target object to each of the beacons based on the reflection data, and determines the position information of the target object based on a distance from the target object to each of the beacons and pre-stored position information of each of the beacons. Thus, accurate position information may be provided where a satellite positioning signal of the target object is weak or there is no satellite positioning signal.

Figure 7:
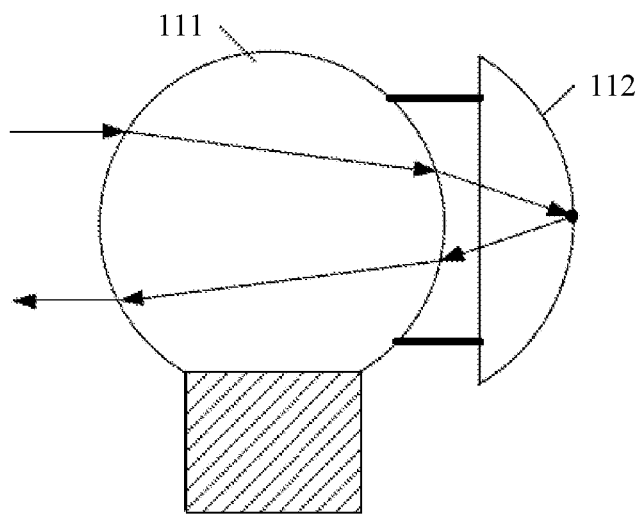
FIG. 7 is a schematic diagram of a spherical beacon according to an embodiment of the present disclosure.

Further, the beacon used in the embodiment of the present disclosure is a spherical beacon. Specifically, as shown in FIG. 7, the beacon includes a spherical lens 111 and a reflection apparatus 112.

Figure 8:
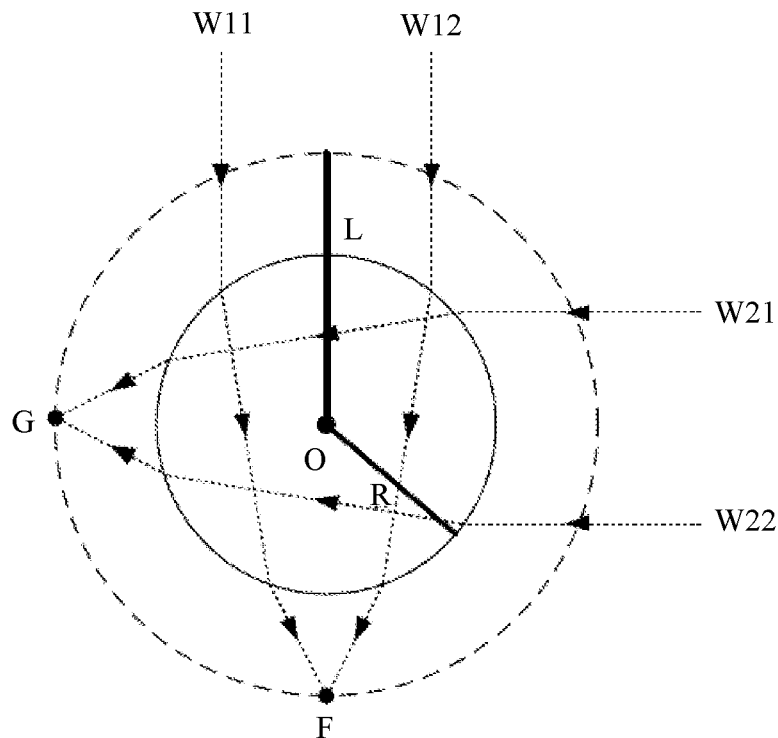
FIG. 8 is a schematic diagram of radar signal transmission of a spherical beacon according to an embodiment of the present disclosure.

FIG. 8 is a schematic diagram of a spherical lens and a reflection apparatus according to an embodiment of the present disclosure. The radar beacon in this embodiment includes a spherical lens and a reflection apparatus, and the reflection apparatus is optionally a curved surface concentric with the spherical lens.

Specifically, as shown in FIG. 8, a solid circle represents a spherical lens, and a dotted circle represents a curved surface concentric with the spherical lens formed by focal points of the spherical lens in different directions, which is hereinafter referred to as a curved surface. The spherical lens and the curved surface have a common spherical center O. Further, the curved surface is concentric with the spherical lens, and a radius of the curved surface is great than a radius of a spherical surface of the spherical lens.

In this embodiment, the radius of the spherical surface is as L in the figure, and the radius of the spherical lens is as R in the figure.

Further, the radius of the spherical surface is greater than the radius of the spherical lens.

Further, the spherical lens is a single medium spherical lens, where the single medium spherical lens refers to a spherical lens made of the same material. Thus, the focal points of the spherical lens in different directions may form a regular spherical surface, and the spherical surface and the spherical lens have the same circle center.

Further, the curved surface is a part of the spherical surface formed by a focal point.

Further, two sets of transmission paths of electromagnetic waves in different directions are shown in the figure, where a first set of electromagnetic waves are W11 and W12, the electromagnetic wave W11 and the electromagnetic wave W12 are shot into the spherical lens in parallel, and after being refracted by the spherical lens, the focal point is point F. A second set of electromagnetic waves are W21 and W22, the electromagnetic wave W21 and the electromagnetic wave W22 are shot into the spherical lens in parallel, and after being refracted by the spherical lens, the focal point is point G.

It can be seen from the figure that after electromagnetic waves in any direction passes through the spherical lens, focal point will be located on the spherical surface finally.

In this embodiment, the material of the spherical lens is Poly tetra fluoroethylene (PTFE). Poly tetra fluoroethylene is a polymer prepared by polymerizing tetra fluoroethylene as a monomer. The shape of the PTFE is white waxy and translucent, has characteristics of excellent heat resistance and cold resistance, low cost, etc., and may be used for a long time at −180~260° C.

Further, a dielectric constant of the spherical lens made based on the poly tetra fluoroethylene in the embodiment of the present disclosure is 2.08.

Further, a distance between the curved surface and a surface of the spherical lens is 0.4R–0.5R, where the distance is a difference between the radius L of the curved surface and the radius R of the spherical lens.

Specifically, through a principle calculation and analog simulation, when the material of the spherical lens is the poly tetra fluoroethylene and the dielectric constant is 2.08, and the distance d from the spherical surface to the surface of the spherical lens is 0.4R, the efficiency of the radar beacon is the highest. When the distance d is 0.5R, the most flat aperture phase is obtained; when d is further increased, both aperture efficiency and a directivity pattern become worse. Therefore, for the spherical lens of the embodiment of the present disclosure, the efficiency of the radar beacon is optimal when d is between 0.4R–0.5R.

Since an angle reflector commonly used in the prior art is composed of three plane mirrors perpendicular to each other, the formed shape and structure makes the angle reflector have a large resistance to wind, and when wind force is strong, some phenomena will happen with the angle reflector, such as shaking, resulting in that a radar measurement system cannot measure or precision of the measurement result is insufficient. However, the spherical lens in this embodiment has a smooth and regular surface, and without a large undulation and a sharp edge and groove, so that the wind may bypass the spherical lens, the resistance to wind is small, and the radar measurement system is not easy to be affected by wind force and causes a measurement error.

In this embodiment, the reflection apparatus 22 is arranged on the spherical surface, and the reflection surface overlaps a part of the spherical surface, and has a reflection surface with the same curvature as the spherical surface.

Further, the radar beacon further includes at least one fixing member connected between the reflection apparatus and the spherical lens for fixing a relative position of the reflection apparatus and the spherical lens.

The radar beacon in the embodiment of the present disclosure is a passive beacon (no additional power supply is required), which is low in price, and may be widely arranged on infrastructure.

According to the technical solutions of the embodiment of the present disclosure, at least one radar beacon combination is installed in a building environment in advance, and the radar moves relatively to the radar beacon combination. Since range precision of the radar is related to crystal oscillator precision, optionally, the radar may be timed through a Beidou satellite positioning system outdoors, and the timing precision may be up to 20 nanoseconds. Therefore, the radar positioning precision in the embodiment of the present disclosure may be maintained within 1 millimeter. In addition, the radar in the embodiment of the present disclosure is not limited to rail transit, and may also be widely used in tunnels and underground scenarios.

In the prior art, a reflection angle of an angle anti-radar is less than 30 degrees, and it is difficult to implement a real-time positioning function. However, the radar is used in conjunction with the radar beacon combination in the embodiment of the present disclosure, so that high-precision positioning information of a moving object in a satellite positioning system may be obtained.

The embodiment of the present disclosure receives reflection data of a radar beacon combination, determines a distance from a target object to each beacon based on the reflection data, and determines the position information of the target object based on a distance from the target object to each beacon and pre-stored position information of each beacon. Thus, accurate position information may be provided where a satellite positioning signal of the target object is weak or there is no satellite positioning signal.

Figure 9:
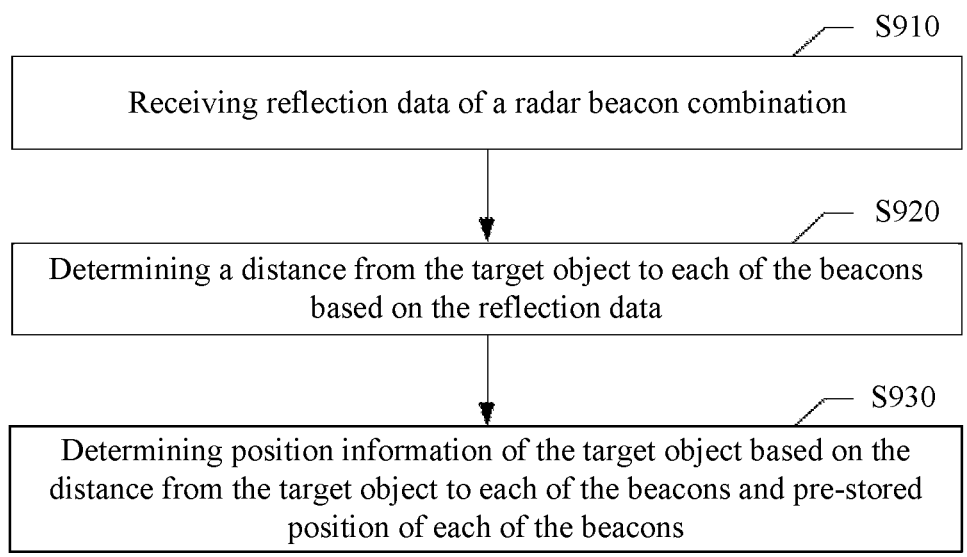
FIG. 9 is a flowchart of a radar positioning method according to an embodiment of the present disclosure.

FIG. 9 is a flowchart of a radar positioning method according to an embodiment of the present disclosure. As shown in FIG. 9, the radar positioning method according to an embodiment of the present disclosure includes the following steps:

step S910: receiving reflection data of a radar beacon combination, where the radar beacon combination includes a plurality of beacons, and the reflection data is an echo signal reflected by each of the beacons.

step S920: determining a distance from the target object to each of the beacons based on the reflection data.

step S930: determining position information of the target object based on the distance from the target object to each of the beacons and pre-stored position information of each of the beacons.

In some embodiments, the method further includes:
determining counting information of the radar beacon combination,
where determining position information of the target object based on the distance from the target object to each of the beacons and pre-stored position information of each of the beacons includes:
obtaining position information of each of the beacons from pre-stored data based on the counting information; and
determining the position information of the target object based on the distance from the target object to each of the beacons and the position information of each of the beacons.

In some embodiments, determining the distance from the target object to each of the beacons based on the reflection data includes:
determining a time difference based on transmission time of the radar signal and reception time of the echo signal; and
determining a distance from the target object to each of the beacons based on the time difference.

In some embodiments, the radar beacon combination includes a first beacon, a second beacon, and a third beacon.

In some embodiments, determining the position information of the target object based on the distance from the target object to each of the beacons and pre-stored position information of each of the beacons includes:
determining position information of a target object in the current step;
determining a matrix parameter based on the position information of the target object in the current step and the position information of each of the beacons;
determining an error correction value based on the matrix parameter and the distance from the target object to each of the beacons;
determining estimation precision based on the error correction value;
in response to the estimation precision being greater than or equal to the predetermined threshold, adjusting the position information of the target object in the current step based on the error correction value; and
in response to the estimation precision being less than the predetermined threshold, determining the position information of the target object in the current step as the position information of the target object.

The embodiment of the present disclosure receives reflection data of a radar beacon combination, determines a distance from a target object to each beacon based on the reflection data, and determines the position information of the target object based on a distance from the target object to each beacon and pre-stored position information of each beacon. Thus, accurate position information may be provided where a satellite positioning signal of the target object is weak or there is no satellite positioning signal.

Figure 10:
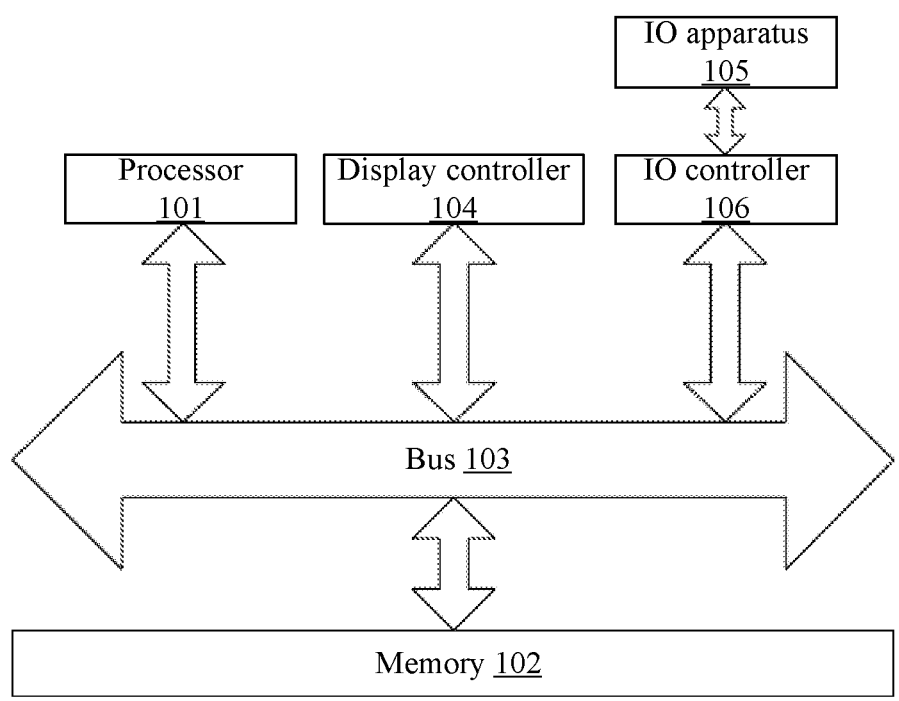
FIG. 10 is a schematic diagram of a control apparatus according to an embodiment of the present disclosure.

FIG. 10 is a schematic diagram of a control apparatus according to an embodiment of the present disclosure. The control apparatus shown in FIG. 10 includes a general hardware structure, and includes at least a processor 101 and a memory 102. The processor 101 and the memory 102 are connected through a bus 103. The memory 102 is adapted to store instructions or programs that are executable by the processor 101. The processor 101 may be an independent microprocessor, or may be a set of one or microprocessors. Thus, the processor 101 implements data processing and control of other apparatus by executing instructions stored in the memory 102 so as to perform the method and procedure of the embodiment of the present disclosure as described above. The bus 103 connects the plurality of components as described above together while connecting the components as described above to a display controller 104, a display apparatus, and an input/output (I/O) apparatus 105. The input/output (I/O) apparatus 105 may be a mouse, a keyboard, a modem, a network interface, a touch input apparatus, a somatosensory input apparatus, a printer, and other apparatus known in the art. Typically, the input/output (I/O) apparatus 105 is connected to a system through an input/output (I/O) controller 106.

Those skilled in the art should understand that the embodiment of the present disclosure may provide a method, an apparatus (a device) or a computer program product. Therefore, the present application may adopt a form of an entirely hardware embodiment, an entirely software embodiment, or an embodiment combining software with hardware. Furthermore, the present application may adopt a computer program product implemented on one or more computer-readable storage medium (including, but not limited to a magnetic disk memory, a CD-ROM, an optical memory, etc.) including a computer usable program code therein.

The present application is described with reference to flowcharts of the method, apparatus (device) and computer program product according to the embodiments of the present application. It should be understood that each procedure in the flowchart may be implemented by computer program instructions.

These computer program instructions may be stored in a computer-readable memory that may guide a computer or other programmable data processing devices to work in a specific manner, so that the instructions stored in the computer-readable memory produce an article of manufacture including an instruction apparatus, and the instruction apparatus implements specified functions in one process or more procedures of the flowchart.

The computer program instructions may also be provided to a general-purpose computer, a special-purpose computer, an embedded processor, or a processor of other programmable data processing devices to generate a machine, so that an apparatus for implementing specified functions in one or more procedures of the flowchart is generated by instructions executed by the computer or the processor of other programmable data processing devices.

Another embodiment of the present disclosure relates to a non-volatile readable storage medium, which is used to store a computer readable program, where the computer readable program is used to assist a computer to perform some or all of the method embodiments described above.

That is, those skilled in the art may understand that all or a part of steps in the method for implementing the above described embodiments may be accomplished by specifying a relevant hardware through a program. The program is stored in a readable storage medium and includes several instructions to enable a device (which may be a single chip, a chip, etc.) or a processor to perform all or a part of the steps of the methods in the embodiments of the present application. The foregoing readable storage medium includes any medium that may store program codes, such as a USB flash disk, a mobile hard disk, a read-only memory (ROM, Read-Only Memory), a random access memory (RAM, Random Access Memory), a magnetic disk, or an optical disk.

The above description is merely preferred embodiments of the present disclosure and is not used to limit the present disclosure. For those skilled in the art, the present disclosure may have various modifications and variations. Any modification, equivalent replacement, improvement, and the like made with the spirit and principle of the present disclosure should be included in the protection scope of the present disclosure.

The invention claimed is:

1. A radar positioning method, comprising:
receiving reflection data of a radar beacon combination, wherein the radar beacon combination comprises at least three beacons and the reflection data are echo signals reflected by each of the beacons, the beacons are set at different positions;
determining distances from a target object to each of the beacons based on the reflection data, the target object being provided with a positioning radar; and
determining position information of the target object based on the distances from the target object to each of the beacons and pre-stored position information of each of the beacons;
wherein the determining position information of the target object based on the distances from the target object to each of the beacons and pre-stored position information of each of the beacons comprises:
determining the position information of the target object in a current step based on an initial value or position information of a last execution step and an error correction value of the last execution step;
determining a matrix parameter based on the position information of the target object in the current step and the position information of each of the beacons;
determining an error correction value of the current step based on the matrix parameter and the distances from the target object to each of the beacons;
determining estimation precision based on the error correction value of the current step;
in response to the estimation precision being greater than or equal to a predetermined threshold, adjusting the position information of the target object in the current step based on the error correction value of the current step characterizing an accuracy error between the position information of the target object in the current step and actual position information of the target object;
wherein the method further comprises:
determining counting information of the radar beacon combination;
wherein the determining position information of the target object based on the distances from the target object to each of the beacons and pre-stored position information of each of the beacons comprises:
obtaining position information of each of the beacons from pre-stored data based on the counting information; and
determining the position information of the target object based on the distances from the target object to each of the beacons and the position information of each of the beacons;
wherein the determining counting information of the radar beacon combination comprises:
in response to a calculated distance between the positioning radar and a beacon in the radar beacon combination meeting a distance condition after the target object entering a tunnel, incrementing the counting information of the radar beacon combination, the distance condition being that the calculated distance increases;
wherein the positioning radar is configured to transmit an electric wave in a predetermined direction, and a transmitting direction of the positioning radar, installation positions of the beacons, and installation directions of the beacons are set to receive the echo signals returned by the radar beacon combination during a movement of the target object in the tunnel.

2. The radar positioning method according to claim 1, wherein the determining distances from the target object to each of the beacons based on the reflection data comprises:
determining time differences based on transmission times of radar signals and reception times of the echo signals; and
determining the distances from the target object to each of the beacons based on the time differences.

3. The radar positioning method according to claim 1, wherein the radar beacon combination comprises a first beacon, a second beacon, and a third beacon.

4. The radar positioning method according to claim 1, wherein the determining position information of the target object based on the distances from the target object to each of the beacons and the pre-stored position information of each of the beacons comprises:
in response to the estimation precision being less than the predetermined threshold, determining the position information of the target object in the current step as the position information of the target object.

5. A positioning radar, comprising:
a receiving apparatus configured to receive reflection data of a radar beacon combination, wherein the radar beacon combination comprises at least three beacons and the reflection data are echo signals reflected by each of the beacons, the beacons are set at different positions; and
a control apparatus configured to determine distances from a target object to each of the beacons based on the reflection data and to determine position information of the target object being provided with the positioning radar based on the distances from the target object to each of the beacons and pre-stored position information of each of the beacons;

wherein the control apparatus is further configured to:
  determine the position information of the target object in a current step based on an initial value or position information of a last execution step and an error correction value of the last execution step;
  determine a matrix parameter based on the position information of the target object in the current step and the position information of each of the beacons;
  determine an error correction value of the current step based on the matrix parameter and the distances from the target object to each of the beacons;
  determine estimation precision based on the error correction value of the current step;
  in response to the estimation precision being greater than or equal to a predetermined threshold, adjust the position information of the target object in the current step based on the error correction value of the current step characterizing an accuracy error between the position information of the target object in the current step and actual position information of the target object;
  wherein the control apparatus is further configured to determine counting information of the radar beacon combination;
  wherein the control apparatus is further configured to obtain position information of each of the beacons from pre-stored data based on the counting information and to determine the position information of the target object based on the distances from the target object to each of the beacons and the position information of each of the beacons;
  wherein the control apparatus is further configured to increment the counting information of the radar beacon combination, in response to a calculated distance between the positioning radar and a beacon in the radar beacon combination meeting a distance condition after the target object entering a tunnel, the distance condition being that the calculated distance increases;
  wherein the positioning radar is configured to transmit an electric wave in a predetermined direction, and a transmitting direction of the positioning radar, installation positions of the beacons, and installation directions of the beacons are set to receive the echo signals returned by the radar beacon combination during a movement of the target object in the tunnel.

6. The positioning radar according to claim 5, wherein the control apparatus is configured to determine time differences based on transmission times of radar signals and reception times of the echo signals and to determine the distances from the target object to each of the beacons based on the time differences.

7. The positioning radar according to claim 5, wherein the control apparatus is configured to:
  in response to the estimation precision being less than the predetermined threshold, determine the position information of the target object in the current step as the position information of the target object.

8. A positioning system, comprising:
multiple radar beacon combinations; and
the positioning radar according to claim 5.

* * * * *